United States Patent

Kain

[11] Patent Number: 5,707,127
[45] Date of Patent: Jan. 13, 1998

[54] THREE-DIMENSIONAL IMAGE VIEWING APPARATUS

[76] Inventor: Meira Kain, Kfar Aviv 79241, Israel

[21] Appl. No.: 673,730

[22] Filed: Jun. 26, 1996

[51] Int. Cl.[6] ............................................. G03B 21/14
[52] U.S. Cl. ........................... 353/15; 353/7; 353/DIG. 2
[58] Field of Search ......................... 353/7, 15, 43, 353/DIG. 2; 359/462, 466, 467, 468, 469, 477

[56] References Cited

U.S. PATENT DOCUMENTS

| 2,273,512 | 2/1942 | Caldwell et al. | 359/466 |
|---|---|---|---|
| 2,771,013 | 11/1956 | Mast | 359/469 |
| 3,388,499 | 6/1968 | Mercorelli | 46/14 |
| 3,562,398 | 2/1971 | Benjamin | 84/1.03 |
| 3,590,525 | 7/1971 | Tomaro | 46/232 |
| 4,116,533 | 9/1978 | Nerlich | 359/469 |
| 4,215,511 | 8/1980 | Todokoro | 46/175 |
| 4,256,367 | 3/1981 | Connors | 359/469 |
| 4,277,152 | 7/1981 | Taylor | 353/15 |
| 4,326,772 | 4/1982 | Hausherr | 353/7 |
| 4,692,710 | 9/1987 | Shvartsman | 328/111 |
| 4,952,024 | 8/1990 | Gale | 359/477 |
| 5,236,364 | 8/1993 | Caparosa | 353/7 |
| 5,251,900 | 10/1993 | Gallant | 273/157 |
| 5,402,702 | 4/1995 | Hata | 84/464 |

*Primary Examiner*—William Dowling
*Attorney, Agent, or Firm*—Ladas & Parry

[57] ABSTRACT

A three-dimensional image edutainment device including a filmstrip including a plurality of images formed thereon, a viewing device for three-dimensionally viewing the filmstrip, an audio device which emits audio signals, wherein a portion of the audio signals combined with the images provide edutainment.

6 Claims, 4 Drawing Sheets

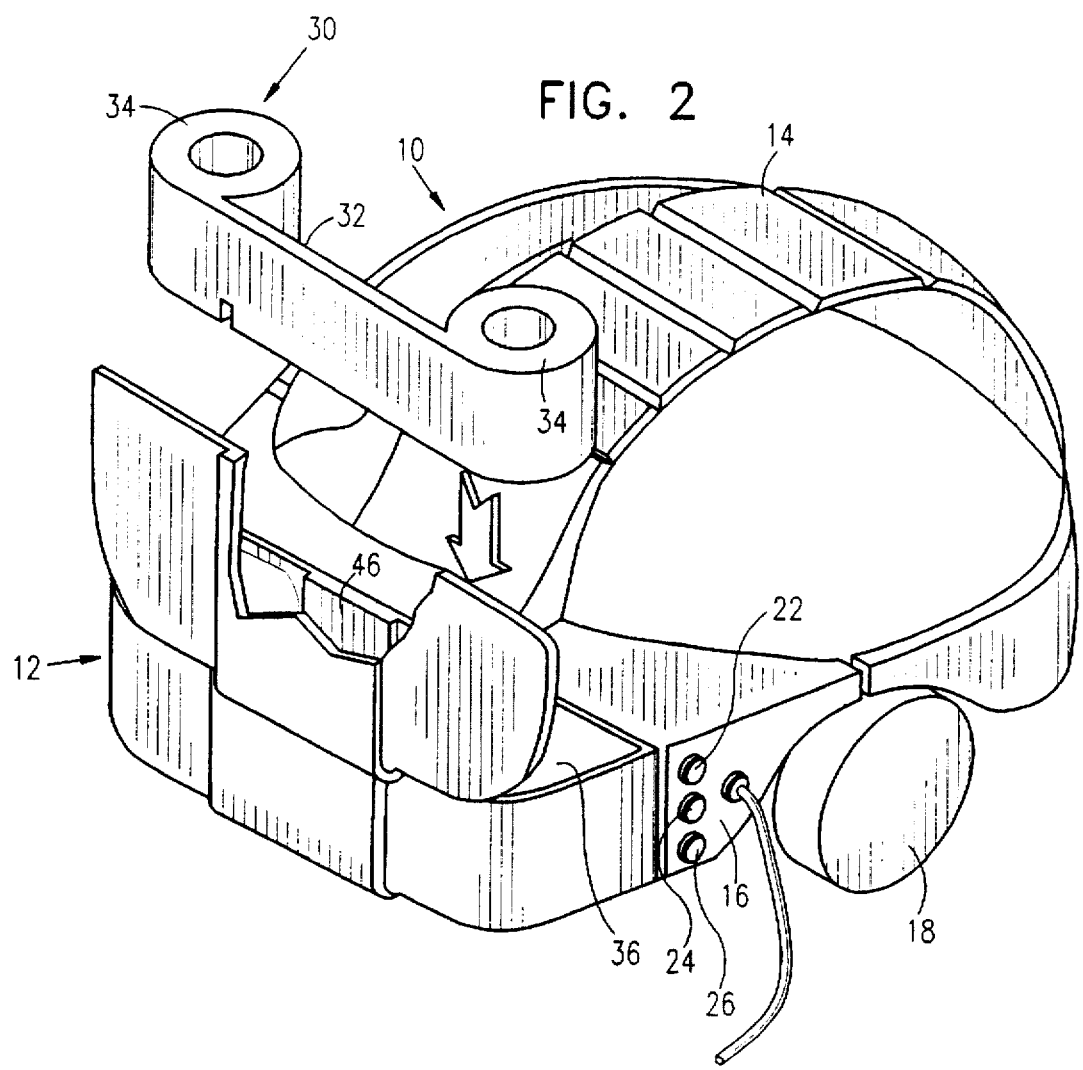
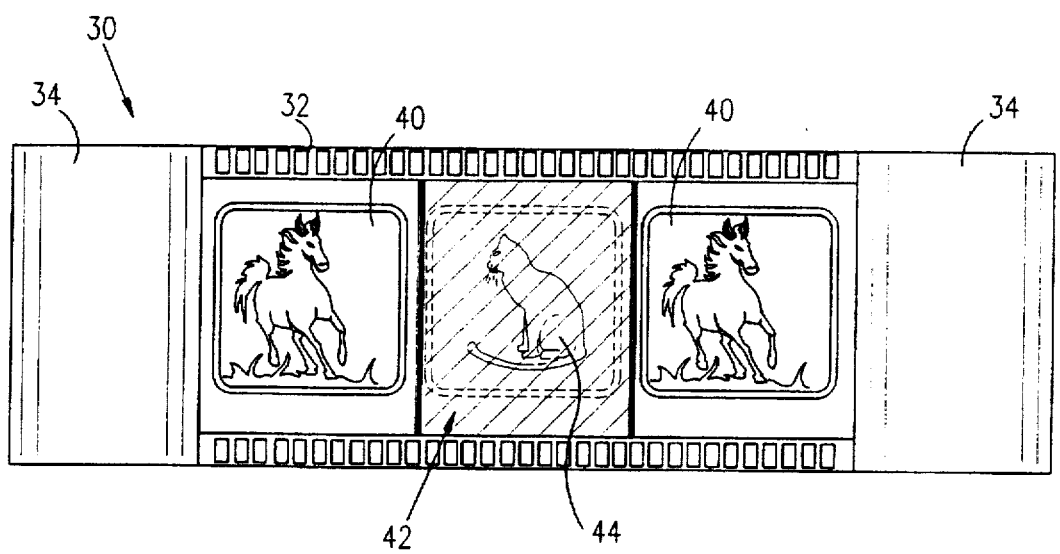

5,707,127

THREE-DIMENSIONAL IMAGE VIEWING APPARATUS

FIELD OF THE INVENTION

The present invention relates to entertainment devices generally and particularly to three-dimensional image entertainment devices.

BACKGROUND OF THE INVENTION

Three-dimensional image entertainment devices are known. The following U.S. Pat. Nos. are believed to be representative of the art: 3,388,499, 3,562,398, 3,590,525, 4,215,511, 4,692,710 and 5,402,702.

A three-dimensional viewer, manufactured by Wrebbit Inc., Ville Saint-Laurent, Quebec, Canada, and marketed under the trade mark 3Discover, includes a cassette with 10 images formed on a filmstrip. A viewer can manually actuate a filmstrip drive to select a particular image.

SUMMARY OF THE INVENTION

The present invention seeks to provide a novel three-dimensional image "edutainment" device which combines audio entertainment and/or education with the three-dimensional images. "Edutainment" is a term used to denote any single use or combined use of education and entertainment. An audio signal is used to trigger a filmstrip drive to change the image being viewed, preferably in accordance with a story or other edutainment sequence. This trigger may cause the filmstrip to move in any predetermined manner, and as will be described in detail below, allows full exploitation of the filmstrip without any need for leaving blank spaces between images. The video and filmstrip drive portion of the device is preferably head mounted.

There is thus provided in accordance with a preferred embodiment of the present invention, a three-dimensional image edutainment device including a filmstrip including a plurality of images formed thereon, a viewing device for three-dimensionally viewing the filmstrip, an audio device which emits audio signals, wherein a portion of the audio signals combined with the images provide edutainment.

In accordance with a preferred embodiment of the present invention, a filmstrip drive is operatively connected to the filmstrip, wherein a portion of the audio signals actuate the filmstrip drive to move the filmstrip, thereby changing which images are viewed by a user. Preferably the filmstrip drive moves the filmstrip in accordance with a predetermined criterion. The device is preferably head mounted.

In accordance with a preferred embodiment of the present invention, the filmstrip includes a plurality of pairs of images formed and arranged on the filmstrip wherein the images comprised in each pair are separated from each other by a space on the filmstrip, the space being substantially filled by another image comprised in another of the pairs.

Additionally in accordance with a preferred embodiment of the present invention, a portion of the viewing device substantially blocks the space from being viewed by a user when viewing the images comprised in one of the pairs.

Further in accordance with a preferred embodiment of the present invention, the filmstrip drive moves the filmstrip by advancing the images alternatively one image at a time and three images at a time.

There is also provided in accordance with a preferred embodiment of the present invention, a filmstrip for use with a three-dimensional image edutainment device, the filmstrip including a plurality of pairs of images formed and arranged thereon, such that the images comprised in each pair are separated from each other by a space on the filmstrip, the space being substantially filled by another image comprised in another of the pairs.

There is also provided in accordance with a preferred embodiment of the present invention, a three-dimensional image edutainment cartridge for use with a three-dimensional image edutainment device, the cartridge including a filmstrip on a windable roll, the filmstrip including a plurality of pairs of images formed and arranged thereon, such that the images comprised in each pair are separated from each other by a space on the filmstrip, the space being substantially filled by another image comprised in another of the pairs.

BRIEF DESCRIPTION OF THE DRAWINGS

The present invention will be understood and appreciated more fully from the following detailed description, taken in conjunction with the drawings in which:

FIG. 2 is a simplified pictorial illustration of inserting a three-dimensional image edutainment cartridge, constructed and operative in accordance with a preferred embodiment of the present invention, in the edutainment device of FIG. 1;

FIG. 3 is a simplified elevational illustration of the three-dimensional image edutainment cartridge, showing the images formed on a filmstrip which a user would see when using the edutainment device of FIG. 1.

DETAILED DESCRIPTION OF A PREFERRED EMBODIMENT

Figure 1:
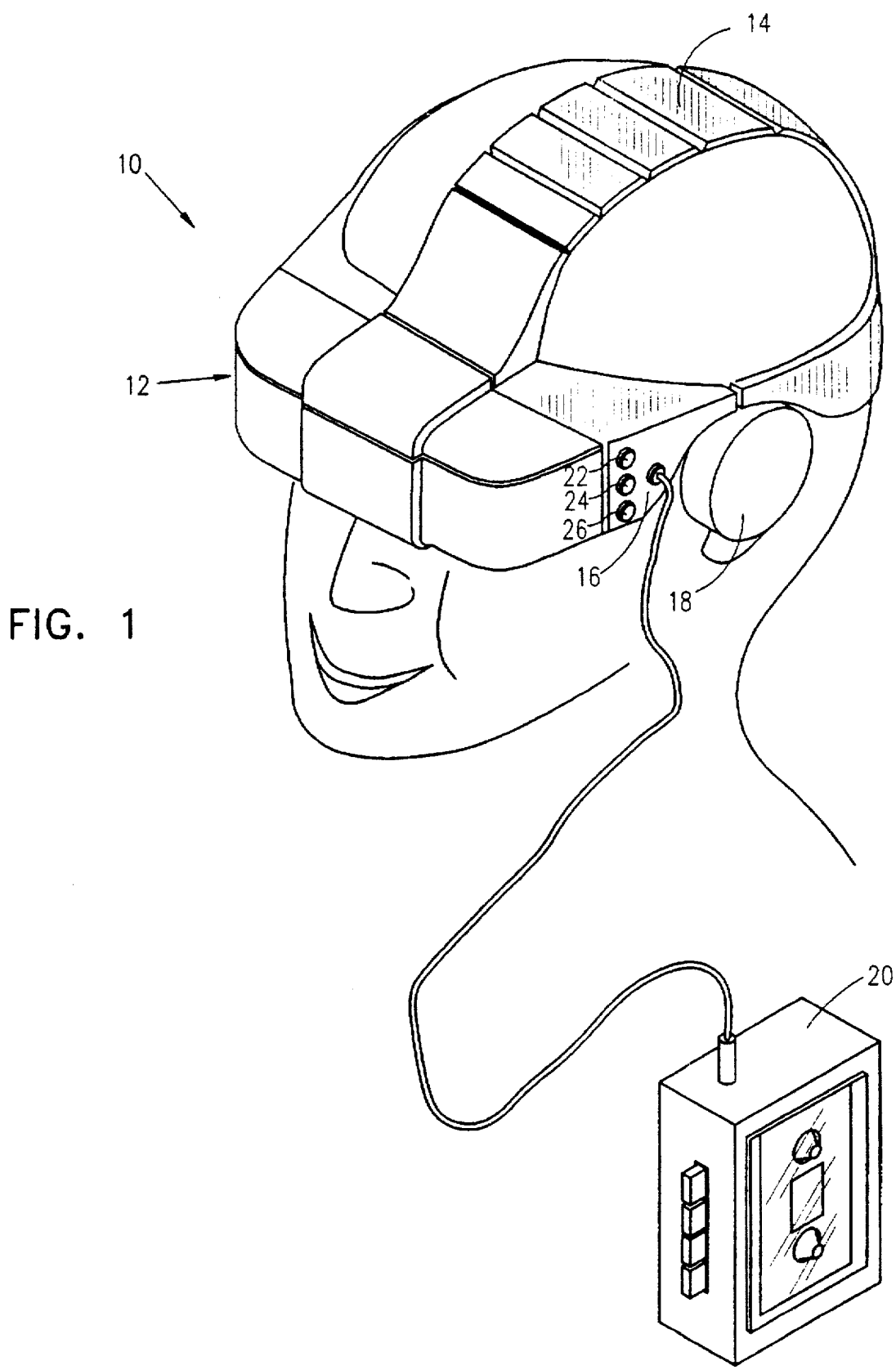
FIG. 1 is a simplified pictorial illustration of an edutainment device, constructed and operative in accordance with a preferred embodiment of the present invention.

Reference is now made to FIG. 1 which illustrates a three-dimensional image edutainment device 10, constructed and operative in accordance with a preferred embodiment of the present invention.

Edutainment device 10 includes a three-dimensional viewing device 12 which is preferably head mounted by means of one or bands 14. Viewing device 12 preferably includes a filmstrip drive 16, a pair of earphones 18 and an audio device 20, such as a cassette player, electrically connected to filmstrip drive 16. Filmstrip drive 16 is preferably a DC motor which is actuated by audio signals emitted by audio device 20. Filmstrip drive 16 preferably includes a plurality of control buttons, such as a reset button 22, a forward control button 24 and a backward control button 26.

Reference is now made to FIG. 2 which illustrates a three-dimensional image edutainment cartridge 30, constructed and operative in accordance with a preferred embodiment of the present invention. Cartridge 30 preferably includes a filmstrip 32 (shown and described hereinbelow with reference to FIG. 3) on one or more windable rolls 34. Cartridge 30 is preferably configured to be placed in a compartment 36 of viewing device 12. Filmstrip drive 16 is preferably operatively connected to cartridge 30 in order to move filmstrip 32. The connection of filmstrip drive 16 to cartridge 30 is preferably accomplished by conventional means which are well known to persons skilled in the art, and are therefore not described in detail.

Reference is now made to FIG. 3 which further illustrates filmstrip 32 of three-dimensional image edutainment cartridge 30. It is seen that filmstrip 32 preferably includes a plurality of images 40. For example, in the illustrated embodiment, a pair of images of horses are formed on filmstrip 32, the horses being separated from each other by a space 42 which is substantially filled by another image 44, such as a cat. The arrangement of the images formed on filmstrip 32 will be described in further detail hereinbelow with respect to FIGS. 4A–4D.

Preferably audio device 20 emits a plurality of audio signals such that a portion of the signals, combined with the images of filmstrip 32, provide edutainment, such as storytelling or narrating information about a geographical or historical site, for example. A portion of the audio signals emitted by audio device 20 is preferably used to trigger filmstrip drive 16 to wind or move filmstrip 32, thereby changing the image being viewed, such as in accordance with the story being told. The audio signals may move filmstrip 32 in any predetermined manner, and as will be described in detail below, may allow full exploitation of filmstrip 32 without any need for leaving blank spaces between images.

Referring again to FIG. 2, it is seen that a portion 46 of viewing device 12 substantially blocks space 42 from being viewed by a user when viewing filmstrip 32. Thus as seen in FIG. 3, when a viewer sees the horses, the cat is substantially blocked from view. It is appreciated that alternative structure may be used to block space 42 from view, such as suitably designed eyepieces (not shown).

Reference is now made to FIGS. 4A–4D which illustrate audio device 20 triggering movement of the images of filmstrip 32, in accordance with a preferred embodiment of the present invention.

Figure 4A:
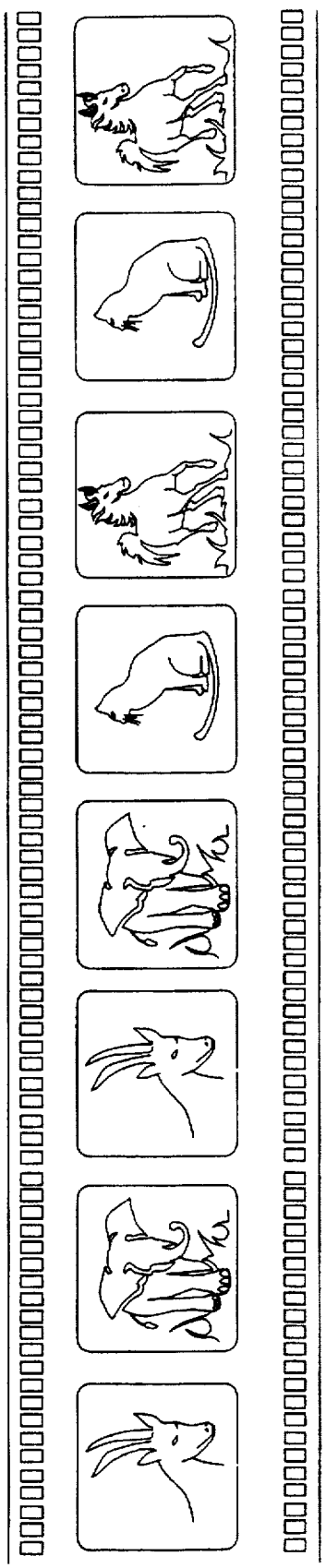
FIGS. 4A-4D are simplified illustrations of an audio device of the edutainment device of FIG. 1 triggering movement of the images, in accordance with a preferred embodiment of the present invention.
Figure 4B:
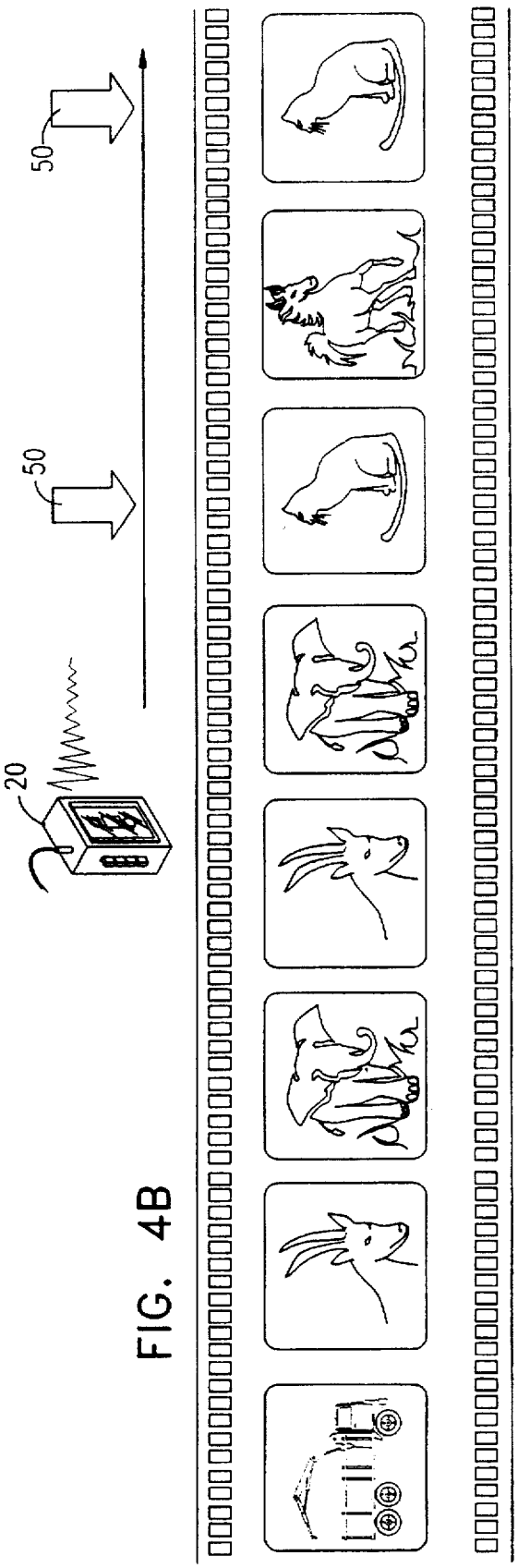

In FIG. 4A, it is seen that filmstrip 32 preferably includes a plurality of pairs of images formed and arranged thereon, such that the images comprised in each pair are separated from each other by a space on filmstrip 32, the space being substantially filled by one or more images comprised in another of the pairs. For example, there may be provided a pair of horses and a pair of cats, the pairs being arranged such that one of the cats is in between the two horses and the other cat is adjacent one of the horses. The cat which is not between the two horses is also adjacent to an elephant which forms a pair of elephants separated by an antelope. The antelope is one of a pair of antelopes, the other antelope being adjacent to one of the elephants.

It is appreciated that FIG. 4A illustrates only one example of images and many other combinations of images are possible within the scope of the present invention.

Starting in FIG. 4A, a viewer sees the pair of horses, the eyes of the viewer (not shown) sighting along a pair of arrows 50. As described hereinabove with reference to FIGS. 2 and 3, the cat between the horses is not visible to the viewer. All other images on filmstrip 32 are also not visible to the user. Upon emission of an audio signal by audio device 20, filmstrip drive 16 (not shown) advances filmstrip 32 one image to the position shown in FIG. 4B. It is seen that the viewer now sees the pair of cats, while the horse between the two cats is now invisible to the viewer. The other horse has now been wound into one of the rolls 34 (not shown).

Figure 4C:
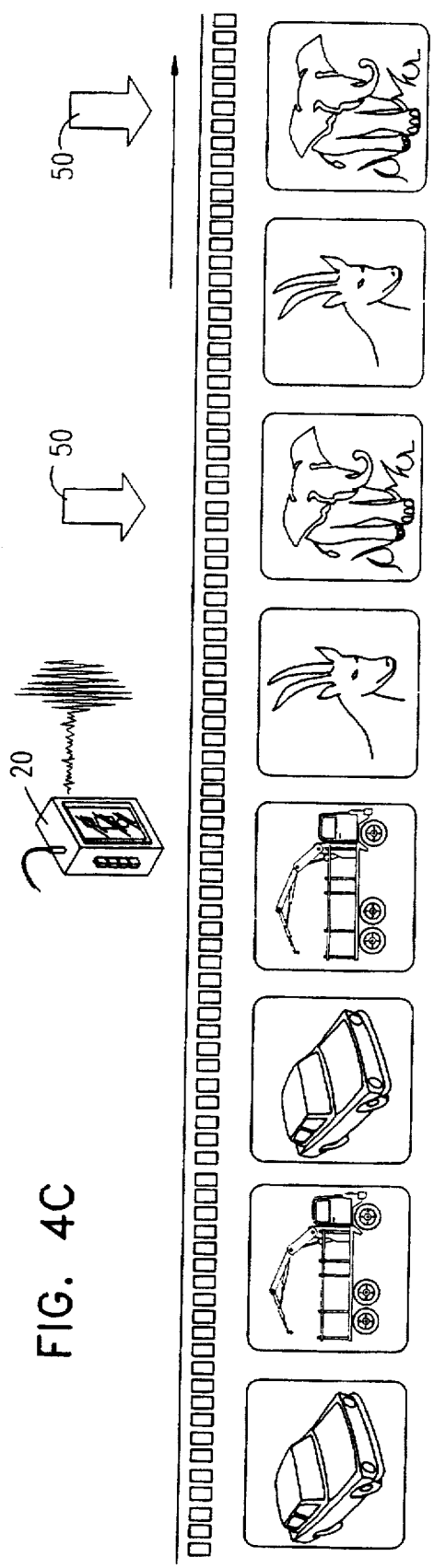

In accordance with a preferred embodiment of the present invention, the next sequential advance of filmstrip 32 is accomplished by another audio signal emitted from audio device 20 which causes filmstrip drive 16 (not shown) to advance filmstrip 32 by three images to the position shown in FIG. 4C. The viewer now sees the pair of elephants, while the antelope between the elephants is not visible. The pairs of horses and cats have been wound into one of the rolls 34 (not shown).

Figure 4D:
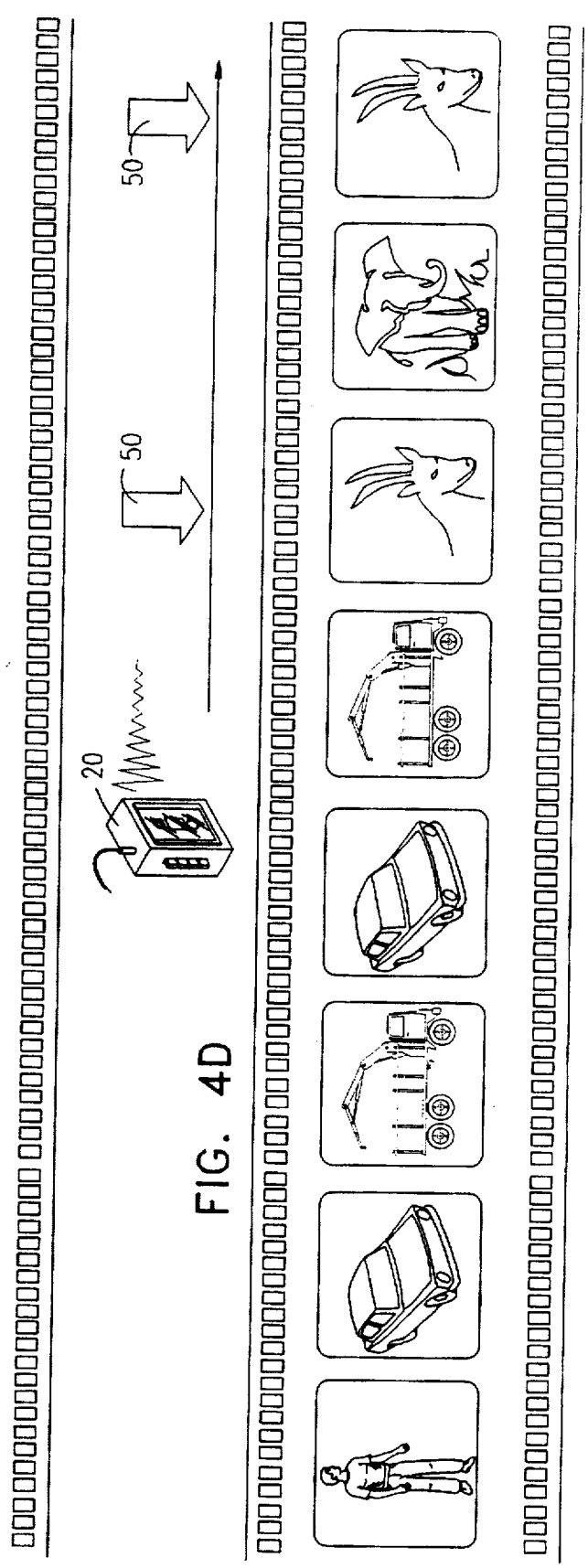

Upon emission of another audio signal by audio device 20, such as the audio signal used in FIG. 4A, filmstrip drive 16 (not shown) advances filmstrip 32 one image to the position shown in FIG. 4D. It is seen that the viewer now sees the pair of antelopes, while the elephant between the two antelopes is invisible to the viewer. The previously viewed images have been wound into one of the rolls 34 (not shown). The sequential advance of filmstrip 32 preferably continues alternatively one image at a time and three images at a time.

Alternatively in accordance with another preferred embodiment of the present invention, audio device 20 may signal filmstrip drive 16 to move filmstrip 32 forwards or backwards in accordance with any predetermined criterion. Each image pair may be assigned an audio code, and emission of the proper code by audio device 20 causes filmstrip 32 to be automatically moved to the desired coded image pair.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

I claim:

1. A three-dimensional image edutainment device comprising:

a filmstrip comprising a plurality of images formed thereon;

a head mounted viewing device for three-dimensionally viewing said filmstrip;

an audio device which emits audio signals, wherein a portion of said audio signals combined with said images provide edutainment.

2. A device according to claim 1 and comprising:

a filmstrip drive operatively connected to said filmstrip, wherein a portion of said audio signals actuate said filmstrip drive to move said filmstrip, thereby changing which images are viewed by a user.

3. A device according to claim 2 and wherein said filmstrip drive moves said filmstrip in accordance with a predetermined criterion.

4. A device according to claim 1 and wherein said filmstrip comprises a plurality of pairs of images formed and arranged on said filmstrip wherein the images comprised in each said pair are separated from each other by a space on said filmstrip, said space being substantially filled by another image comprised in another of said pairs.

5. A device according to claim 4 and wherein a portion of said viewing device substantially blocks said space from being viewed by a user when viewing the images comprised in one of said pairs.

6. A device according to claim 2 and wherein said filmstrip drive moves said filmstrip by advancing said images alternatively one image at a time and three images at a time.

* * * * *